Patented Apr. 15, 1952

2,592,655

UNITED STATES PATENT OFFICE 2,592,655

PROTECTIVE COATING

Earl Francis Carlston, Arlington, Va., and Leo Robert Whiting, Woodbridge, N. J., assignors to the United States of America, as represented by the Secretary of the Navy No Drawing. Application July 10, 1945,
Serial No. 604,298

13 Claims. (Cl. 260—27)

Our invention relates to a coating composition and has particular reference to a coating composition for ship bottoms and other surfaces subject to prolonged underwater exposure.

In the past, a large number of coating compositions have been proposed for ship bottoms and other underwater surfaces which will render such surfaces resistant to fouling by barnacles and other marine growth. Compositions of this character have consisted of a toxic agent dispersed in a suitable binder. Suitable toxic agents that have been proposed for this purpose are copper, cuprous oxide, mercury compounds, arsenicals, etc. In the prior art, primary attention has been directed to the particular type of toxic compound to be used and a large number of new toxic materials have been suggested for incorporation into anti-fouling paints. However, it has been found, in accordance with this invention, that the selection of a proper binder for the toxic compound in the coating composition is exceedingly important. Thus, if a binder having the proper constituents is used, the paint film may be readily applied to the desired surface and the coating will retain its anti-fouling properties for a long period of time. The anti-fouling paints of the prior art have been unsatisfactory for one of two reasons. On the one hand, they may be formulated in such a manner that the toxic compound is rapidly leached out of the coating so that the effectiveness of the coating against fouling organisms is markedly reduced after the coated surface has been submerged for relatively short periods. On the other hand, those previously proposed coating compositions from which the toxic agents are not readily leached are so formulated that there is insufficient liberation of toxic agent to prevent fouling on the surface to which the coating is applied.

In general, it may be stated that the desideratum of an anti-fouling paint is to provide a coating in which the toxic agent will be leached from the surface thereof at a rate which will prevent fouling but which will not result in a complete dissipation of the toxic agent in a relatively short period of time. It has been the practice in the past to attempt to provide a coating having a binder which will slough off of the surface as the toxic particles are leached out, the theory being to always expose a surface containing the toxic agent. However, it has been discovered, in accordance with this invention, that this is not the most desirable set of conditions for an anti-fouling paint film. It appears that under certain conditions, hereinafter to be described, that it may be desirable to have a tough binder which will retain its shape and the thickness of the paint film even after a large proportion of the toxic agent has been leached out.

Accordingly, it is one object of this invention to provide a coating composition which may readily be prepared and applied to ship bottoms and other surfaces.

A further object of this invention is the provision of a paint film having anti-fouling properties and which will maintain these properties for a substantial period of time.

A still further object of this invention is the provision of a paint film which will retain its structure and original thickness even after a substantial portion of the toxic material has been leached out.

A still further object of this invention is the provision of an anti-fouling paint composition which has exceedingly large quantities of toxic agent dispersed therein in amount in excess of that contemplated in the prior art.

Further and additional objects will appear from the following description and the appended claims.

In accordance with this invention, an anti-fouling paint composition has been prepared which comprises solid particles of a toxic agent selected from the group consisting of copper and cuprous oxide, an extremely sea water-insoluble binder capable of forming a film which will permit of the toxic agent leaching or permeating therethrough, and a solvent for the binder, the weight ratio of said toxic agent to said binder being greater than 3 to 2. Expressed in another way, the composition of this invention comprises particles of a solid toxic agent dispersed in a solution of a tough insoluble binder, the amount of toxic agent being greater than 60% based on the total weight of binder and toxic agent. For best results, it is preferred that the percentage of toxic agent be greater than 70% (a weight ratio of 7 to 3). The upper percentage limit is dependent on the particular toxic agent, the binder used, the surface to be coated and in general will be any percentage which will result in a paint film having the desired anti-fouling and adhering properties.

The toxic agents that are contemplated by this invention are copper and/or cuprous oxide. However, if desired, other toxic agents such as mercuric oxide, calomel, certain arsenicals, etc., may be admixed therewith.

In the selection of a binder to be used in accordance with this invention it is important to employ one which is extremely insoluble in the water or the sea water in which the coated surface is to be submerged. Conceivably, a large number of binders could be employed for this purpose. Those that have been found to be particularly effective are polyvinyl butyral and the co-polymers of vinyl acetate and vinyl chloride. However, it will be recognized that certain other materials such as synthetic rubbers, certain methacrylates, polystyrene type resins or polyethylenes could also be used. As indicated above, the binder should be capable of forming a film which is substantially insoluble in sea water or fresh water. However, if the resulting paint structure is such that the individual particles of toxic agent do not actually touch each other, the binder also should have properties such that the toxic agent may be slowly leached through such films. In the case of polyvinyl butyral or vinyl chloride—vinyl acetate co-polymer resins it may be necessary to admix an agent such as rosin therewith to permit a leaching action to take place to the desired degree. Thus very satisfactory paint films have been prepared in accordance with this invention which are prepared from a binder comprising a mixture of rosin and a vinyl type resin. On the other hand, if a very high percentage of toxic agent is present in the paint in amounts such that the particles actually touch each other, the openings formed in the film around dissolved particles will permit of the desired leaching to take place and it may not be necessary to add the rosin or other agent to the binder.

It will be readily apparent that any suitable solvent may be employed for preparing the coating composition of this invention. In general, the solvent will depend upon the particular binder used and upon the characteristics desired of the coating composition. This will readily be apparent to any one familiar with the coating art. For example, if a binder comprising Vinylite (a co-polymer of vinyl chloride and vinyl acetate) is used, suitable solvents may be acetone, methyl ethyl ketone or other ketones or mixtures thereof to which certain hydrocarbon solvents such as toluol or xylol may or may not be added. In the case of a polyvinyl butyral binder, an alcohol may be a suitable solvent either alone or in combination with certain hydrocarbon solvents. In the case of chlorinated rubber binders, suitable solvents may be toluol, xylol or other hydrocarbons. In general, the amount of solvent to be used in any particular case will depend upon drying rates, methods to be used for applying the coating composition, etc. The solvent must dissolve the binder, should not have too high a viscosity, and the last traces of solvent in the drying film should not precipitate the binder.

As previously indicated, under certain conditions, rosin may be a desirable additive to certain of the vinyl resin binders to provide a composition having the desired properties. In general, it is thought that the rosin has a tendency to allow a certain amount of water to pass through a film of the binder thereby attaining a proper degree of leaching. Also the rosin is very sticky and promotes adherence of the binder to the toxic particles and to the surface to which the composition is applied. The rosin may be eliminated where the particles actually touch each other in the final paint film thereby providing minute apertures through which the toxic agent may be leached.

For a more complete understanding of this invention there are disclosed in the following a number of specific formulae indicating compositions which were prepared in accordance with this invention. All amounts are expressed in parts by weight and the particular solvent in each case has been eliminated from consideration. However, as will be apparent from the foregoing, the selection of a solvent is not critical so long as the above discussed requirements for the solvent are met. The Vinylite VYHH, specified in certain of the following formulae, is a co-polymer of vinyl chloride and vinyl acetate.

Formula I
| | |
|---|---|
| Cu₂O | 83.3 |
| Vinylite VYHH | 4.2 |
| Rosin | 12.5 |

Formula II
| | |
|---|---|
| Cu₂O | 83.3 |
| Vinylite VYHH | 8.4 |
| Rosin | 8.4 |

Formula III
| | |
|---|---|
| Cu₂O | 45.5 |
| HgO | 45.5 |
| Vinylite VYHH | 4.5 |
| Rosin | 4.5 |

Formula IV
| | |
|---|---|
| Cu₂O | 76.0 |
| Polyvinyl butyral | 6.0 |
| Rosin | 18.0 |

Formula V
| | |
|---|---|
| Cu flake | 76.0 |
| Polyvinyl butyral | 6.0 |
| Rosin | 18.0 |

Formula VI
| | |
|---|---|
| Cu flake | 93.0 |
| Polyvinyl butyral | 7.0 |

It has been found that paint films having the above indicated compositions, when applied to ship bottoms and other surfaces submerged in sea water, are very effective in preventing fouling by barnacles and other marine organisms. This antifouling property persists for eighteen months or longer. This is an exceptional improvement over the prior art anti-fouling paint compositions wherein the effectiveness of the paint film is only rarely longer than about six months.

In accordance with this invention, it is preferred to use flaked copper or cuprous oxide as the toxic agent. However, certain other toxic agents, such as mercuric oxide, may be effectively admixed therewith. In a coating composition containing copper or cuprous oxide particles it is visualized that the copper or copper compounds are slowly leached out of the spaces in the binder containing these toxic compounds. Under ordinary conditions this leaching will start at the surface of the paint film which is exposed to the water. The binder, as before stated, is extremely insoluble in the water and, accordingly, it does not have a tendency to dissolve or slough off when the toxic agent has been leached out. Thus the initial thickness and protective value of the paint are preserved even though the leaching has progressed to a substantial extent. The very high percentages of toxic agent, however, that may be incorporated into binders of this general character allow the resulting film to be effective as an anti-fouling agent for long periods of time.

Several theories have been advanced as to the mechanism of the action of the copper or cuprous oxide in an anti-fouling paint of the character disclosed herein. It is believed that the effectiveness of the disclosed composition is due in part to the leaching of copper or copper compounds from the interior of the paint film and subsequent deposition of the copper in the form of the extremely insoluble basic copper carbonate in the voids in the film left adjacent the surface thereof from which the toxic compound had previously been leached. The presence of this insoluble basic carbonate is thought to be very effective in preventing fouling and the supply of this basic carbonate is constantly replenished by the leaching of copper from the interior of the paint film. However, whatever the mechanism that may be involved in imparting the desired properties to the paint composition of this invention, it is understood that it is not to be strictly limited thereto.

It is important that the paint retain its original structure even as the leaching process proceeds. This is effected by providing the extremely water-insoluble binder capable of forming thin films through which the toxic agent may be leached at a controlled rate. This leaching is effected directly through the films between the particles or through the minute apertures that may be formed between leached-out particles of toxic agent that were initially contacting each other. Irrespective of the mechanism of leaching through the films, however, the initial weight ratio of toxic agent to binder should be at least 3 to 2 and preferably at least 7 to 3.

In the following claims wherein a film which will permit leaching therethrough is specified, it is intended to mean a film which is capable of permitting direct leaching therethrough or which is provided with the above-referred-to minute apertures which will permit such leaching.

It will be apparent from the foregoing that many variations and modifications may be made without departing from the spirit and scope of this invention and it is intended that the invention be limited only by the scope of its appended claims.

What we claim is:

1. An anti-fouling paint composition comprising at least 60% by weight of a solid particulate toxic agent selected from the group consisting of copper, cuprous oxide and a mixture of cuprous oxide and mercuric oxide, up to 18% by weight rosin, and the total being made up to 100% by the addition of a binder selected from the group consisting of copolymerized vinyl chloride-vinyl acetate and polyvinyl butyral.

2. An anti-fouling paint composition in accordance with claim 1 wherein the percentage of toxic agent present is in the range of 76% to 93% by weight, the rosin is up to 18% by weight and the total is made up to 100% by the addition of a binder present in the range of 4.2% to 8.3% by weight.

3. An anti-fouling paint composition comprising 70% by weight of a solid particulate toxic agent selected from the group consisting of copper, cuprous oxide, and a mixture of cuprous oxide and mercuric oxide, rosin present in the quantity of 18% by weight, and a binder selected from the group consisting of copolymerized vinyl chloride-vinyl acetate and polyvinyl butyral present in the quantity of 12% by weight.

4. An anti-fouling paint composition comprising at least 60% by weight of solid particulate metallic copper, up to 18% by weight rosin and the total being made up to 100% by the addition of a binder selected from the group consisting of copolymerized vinyl chloride-vinyl acetate and polyvinyl butyral.

5. An anti-fouling paint composition comprising at least 60% by weight of a particulate cuprous oxide, up to 18% by weight rosin and the total being made up to 100% by a binder selected from the group consisting of copolymerized vinyl chloride-vinyl acetate and polyvinyl butyral.

6. An anti-fouling paint composition comprising at least 60% by weight of a particulate mixture of cuprous oxide and mercuric oxide, up to 18% by weight rosin, and the total being made up to 100% by the addition of a binder selected from the group consisting of copolymerized vinyl chloride-vinyl acetate and polyvinyl butyral.

7. An anti-fouling paint composition comprising at least 70% by weight of particulate cuprous oxide, about 18% by weight of rosin, and a binder consisting of about 6% by weight of a sea-water insoluble vinyl polymer.

8. An anti-fouling paint composition comprising at least 70% by weight of particulate cuprous oxide, about 18% by weight of rosin, and a binder consisting of about 6% by weight of vinyl acetate-vinyl chloride copolymer.

9. An anti-fouling paint composition comprising at least 60% by weight of a solid particulate toxic agent selected from the group consisting of copper, cuprous oxide and a mixture of cuprous oxide and mercuric oxide, from 4.5% to 18% by weight rosin, and a binder selected from the group consisting of copolymerized vinyl chloride-vinyl acetate and polyvinyl butyral.

10. An anti-fouling paint composition in accordance with claim 9 wherein the percentage of toxic agent present is in the range of 76% to 93% by weight, the rosin is present in the range from 4.5% to 18% by weight and the binder is present in the range of 4.2% to 8.3% by weight.

11. An anti-fouling paint composition comprising at least 60% by weight of solid particulate metallic copper, from 4.5% to 18% by weight rosin, and a binder selected from the group consisting of copolymerized vinyl chloride-vinyl acetate and polyvinyl butyral.

12. An anti-fouling paint composition comprising at least 60% by weight of particulate cuprous oxide, from 4.5% to 18% by weight rosin, and a binder selected from the group consisting of copolymerized vinyl chloride-vinyl acetate and polyvinyl butyral.

13. An anti-fouling paint composition comprising at least 60% by weight of a particulate mixture of cuprous oxide and mercuric oxide, from 4.5% to 18% by weight rosin, and a binder selected from the group consisting of copolymerized vinyl chloride-vinyl acetate and polyvinyl butyral.

EARL FRANCIS CARLSTON.
LEO ROBERT WHITING.

REFERENCES CITED

The following references are of record in the file of this patent:

UNITED STATES PATENTS

| Number | Name | Date |
|---|---|---|
| 389,875 | Dahl | Sept. 25, 1888 |
| 2,287,218 | Young et al. | June 23, 1942 |